United States Patent Office 3,829,324
Patented Aug. 13, 1974

3,829,324
BONDING CONDENSATION POLYMERS TO POLYMERIC BASE MATERIALS
Pierre J. J. B. Blais, David J. Carlsson, and David M. Wiles, Ottawa, Ontario, Canada, assignors to Canadian Patents and Development Limited, Ottawa, Ontario, Canada
No Drawing. Continuation of abandoned application Ser. No. 24,383, Mar. 31, 1970. This application Mar. 8, 1972, Ser. No. 232,921
Int. Cl. B44d 1/092; C23c 11/00
U.S. Cl. 117—47 A        12 Claims

ABSTRACT OF THE DISCLOSURE

Polymeric substrates are provided with coatings of condensation polymers which provide a wide variety of improved physical, chemical and mechanical properties by first exposing the substrate to an electrical discharge and subsequently applying to the treated substrate the monomeric precursor or precursors of a condensation polymer. Polymerization of the precursors takes place rapidly to produce a strongly adherent coating of the condensation polymer. Polymeric substrates which are particularly useful are polyolefins, polyesters, polyvinyl or polyvinylidene compounds and cellulose and its derivatives and these can usefully be coated with condensation polymers, even those with which they are normally incompatible.

---

This application is a continuation of parent application Ser. No. 24,383 filed Mar. 31, 1970 and now abandoned.

The invention relates to a process for providing a polymeric substrate with a coating of a condensation polymer.

It is frequently desired to modify the properties of a polymeric article by applying a coating layer to the surface of the article, the material from which the coating layer is made having different properties than the properties of the polymeric substrate. Thus, for example, it is sometimes desired to improve the dyeability of polyolefins, polyesters such as polyethylene terephthalate, and polyvinyl compounds such as polyvinyl chloride. Other reasons for applying a coating are to improve or modify the electrical properties of a polymeric article, for example, by reducing the tendency of the article to collect static electricity; to modify the permeability of the article to gases or liquids; to improve the stability of the article to light, chemicals and/or heat; to improve the resistance of the article to attack by microorganisms; to render the article less flammable; to improve the abrasion or flex resistance of the article, or to improve the surface appearance of the article.

Whatever the reason for coating the polymeric article, the material from which the coating is made should be chosen with a view to improving the particular property or quality of the substrate which is deficient. Coating materials which are frequently chosen are various polymeric materials and these have hitherto been applied by a wide variety of techniques. To meet the need to produce coated products on a mass production basis these coating techniques must be capable of providing uniform coated products in an inexpensive and readily reproducible manner. It has, for example, been suggested to apply a polymeric coating to a surface of a polymeric substrate which has previously been subjected to a treatment which improves the bonding properties of its surface. One such process is described in U.S. Pat. No. 3,262,808 in which films of polypropylene are coated with polymeric heat seal coatings after the surface of the polypropylene film has been treated to render it more receptive, for example by exposure to a corona discharge in the presence of oxygen. The polymeric heat seal coating may then be applied by solution coating or by applying an aqueous dispersion of the polymeric material to the treated surface of the polypropylene film. It has also been suggested to coat various substrates by exposing them to a corona discharge in the presence of monomers which undergo polymerization under the influence of the corona discharge.

It is an object of the present invention to provide a process for surface coating various polymeric substrates with strongly adherent coatings of condensation polymers in a simple manner using monomeric starting materials to produce the condensation polymer *in situ*.

The present invention provides a process for providing a polymeric substrate with a coating of a condensation polymer which comprises exposing the polymeric substrate to an electrical discharge, subsequently applying to the treated substrate the monomeric precursor or precursors of a condensation polymer, and polymerising the precursor or precursors *in situ* on the substrate by stepwise polymerization. The monomeric precursors rapidly polymerize on the surface of the substrate to produce a strongly bound coating of the condensation polymer, which effectively modifies and improves some of the properties of the polymeric substrate or which produces a bicomponent structure having entirely new properties.

The exposure of the substrate to an electrical discharge is essential if a strong bond is to be obtained, particularly if the coating and the substrate are not normally compatible.

The electrical discharge may be any one of the known types of electric-field plasmas. For convenience there can be classified into three basic groups, namely the arc, the glow discharge and the corona discharge. They are described in, for example, "Economics and Technology of Chemical Processing with Electric-field Plasmas" by Dundas and Thorpe, Chemical Engineering, June 30, 1969, pages 124–128. While any type of electrical discharge may be employed, the corona discharge is preferred because of the experimental simplicity and associated ease of continuous processing possible with this technique. The invention will therefore be described particularly with respect to corona discharge.

Corona discharge is produced by capacitatively exciting a gaseous medium which is present between two spaced electrodes, at least one of which is insulated from the gaseous medium by a dielectric barrier. Corona discharge is limited in origin to alternating currents because of its capacitative nature. It is a high voltage, low current phenomenon with voltages being typically measured in kilovolts and currents being typically measured in milliamperes. Corona discharges may be maintained over wide ranges of pressure and frequency. Pressures of from 0.2 to 10 atmospheres generally define the limits of corona discharge operation and atmospheric pressures generally are preferred. Frequencies ranging from 20 Hz. to 100 mHz. can conveniently be used; preferred frequently ranges are from 500, especially 3000, Hz. to 10 mHz.

When dielectric barriers are employed to insulate each of two spaced electrodes from the gaseous medium, the corona discharge phenomenon is frequently termed an electrodeless discharge, whereas when a single dielectric barrier is employed to insulate only one of the electrodes from the gaseous medium, the resulting corona discharge is frequently termed a semi-corona discharge. The term "corona discharge" is used throughout this specification to denote both types of corona discharge, i.e. both electrodeless discharge and semi-corona discharge.

The effect of exposing the polymeric substrate to the electrical discharge is not fully understood. It appears possible, however, that some form of chemical activation of the surface takes place at the same time as does some attrition of the substrate. The surface activation apparently provides bonding sites for the coating of the condensation polymer but the nature of the bond is not known.

The polymeric substrates which may be coated in accordance with the invention can be any one of a wide variety of natural or synthetic polymeric substrates or may be formed from blends or mixtures thereof. Natural substrates which may be used include wool, cellulose and cellulose derivatives such as regenerated cellulose; synthetic substrates include such polyesters as polyethylene terephthalate, such polyolefins as polyethylene, polypropylene, polybutene-1, polyisobutylene and polystyrene, such polyvinyl and polyvinylidene compounds as polyvinyl chloride, polyacrylonitrile and polyvinylidene chloride, and various substituted derivatives of such polymers, for example polytetrafluoroethylene. Since polyolefin substrates are available at low cost and have such advantageous properties as high strength, low density and resistance to chemical attack, they are preferred. It is an important feature of the present invention that such substrates can be provided with strongly adherent coatings of condensation polymers with which they are normally incompatible. The polymeric substrates may be in the form of, for example, films, fibres and filaments, or may have been fabricated, by known techniques into woven, non-woven or knitted articles. Polymeric substrates in the form of various extruded or moulded shapes may also be treated in accordance with the invention.

The polymeric substrate may be exposed to the electrical discharge in an atmosphere consisting of air or other oxygen-containing gas or consisting of an inert gas such as nitrogen, which inert gas may contain a small proportion of a relatively reactive gas such as ammonia, for example nitrogen containing 5% by weight of ammonia. The length of exposure of the polymeric substrate to the electrical, particularly corona, discharge can be very short, of the order of small fractions of a second to two seconds, or can extend for periods of up to several minutes. Since, for reasons of economy, no appreciable advantage accrues from the use of extended exposure times it is preferred that the length of exposure of the substrate to the discharge be as short as possible.

In general the current, voltage and power utilised in generating an electrical discharge for any specific coating process in accordance with the invention can vary over wide limits depending, for example, upon the thickness of the dielectric barrier or barriers employed between the electrodes, the shape of the electrodes, the spacing between the electrodes and the nature and pressure of the gaseous medium between the electrodes.

The monomeric condensation polymer precursor or precursors may be applied by any conventional technique. Thus the precursors may be applied in the solid, liquid or vapour state. When applied as liquids the exposed substrate can be dip or spray coated with a monomeric solution of the constituent monomer or monomers of the condensation polymer. Depending upon the nature of the monomer the solution may be in such solvents as halogenated hydrocarbons, for example, carbon tetrachloride or tetrachloroethylene, aromatic hydrocarbons, for example toluene or benzene, or polar solvents, for example acetone, or may be in an aqueous medium. Alternatively the monomer may be applied undiluted. When two or more monomers are employed in the formation of the condensation polymer, then the exposed substrate is treated first of all with one of the constituent monomers and, preferably after excess of the first monomer has been removed, for example by drying, the treated exposed substrate is then treated with the second monomer. The monomeric precursors of condensation polymers may be applied in either sequence consistent with the formation of a coating of the desired properties. For cases where one monomer (or a solution of it) wets the coronaed substrate better than the other monomer, the application of the former first is preferred to obtain a more uniform coating. The condensation polymerisation of the two monomers takes place to high conversion to form the desired coating layer of the condensation polymer. The thus coated substrate may then be dried to remove any traces of solvent or unreacted monomer, and may, if desired, be subjected to a heat treatment step to improve the properties of the coatings. The heat treatment should be carried out under such conditions of temperature and duration as do not adversely affect the polymeric substrate or its coating. In general, however, suitable temperatures are from 75° to 150° C. The condensation polymerisation can take place to the extent that the monomer present in the lesser proportion is completely used up so that it may be preferable to use stoichiometric quantities of the monomers.

Throughout this specification the polymers which are coated on the substrate are referred to as condensation polymers. Such condensation polymers are typically produced with the concurrent production of by-product small molecules, such as water, hydrogen chloride or ammonia. For example polyamides are typically produced by the polycondensation of polyamines with polybasic acids in accordance with the scheme:

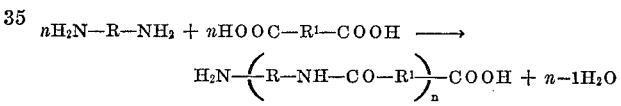

It should, however, be recognised that the classification of polymers based upon the stoichiometry of the polymerisation is not entirely satisfactory. Thus polyamides, for example, can be produced from monomeric precursors by a reaction not involving the concurrent production of water. The polymerisation of ε-caprolactam is a case in point since this monomer, which can be regarded as an internal amide or anhydride or an α,ω-amino carboxylic acid, polymerises without the production of by-product water. A similar case involves the polymerisation of β-propriolactone, which can be regarded as an internal ester or anhydride of an a,ω-hydroxycarboxylic acid, and which polymerises to produce a polyester without the production of by-product water. Polymers produced by the polymerisation of such monomeric precursors as can be regarded as the anhydrides of typical condensation polymer precursors are included within the term "condensation polymers."

All these condensation polymers are produced by a stepwise polymerisation in which polymer growth proceeds by a series of discrete reaction steps involving monomer and/or intermediate. The intermediates are relatively stable (or even isolable) chemical compounds with functional groups characteristic of the monomer. The concentration of growing species is high, but the average degree of polymerisation is quite low until the last stages of reaction, when it surges upward. Stepwise polymerisation is to be contrasted with chain reaction polymerisation, of which the free-radical polymerisation of vinyl compounds is a typical example, in which the intermediate active centres are highly unstable and usually transient and propagation occurs rapidly relative to initiation. The products of a chain-reaction polymerisation are frequently referred to as addition polymers.

In the case where a bifunctional or cyclic monomer, such as caprolactam, 2-pyrrolidone and β-propiolactone, is used which is capable of self-condensing to form the condensation polymer it is necessary only to apply the one monomer to the exposed substrate in order to produce the required coating of the condensation polymer. If desired, thicker layers of any condensation polymer coating may be built up by repeating the treatment either with or without an intermediate exposure to the electrical discharge of the coated polymer substrate. The coating thickness may also be adjusted by varying the concentration of a monomer solution.

The preferred condensation polymers which are formed on the polymeric substrate in accordance with the invention are polyamides, polysulfonamides, polyurethanes, polyepoxies or polyesters. The polyamides preferably are polymers formed by the self-condensation of an aminoacid or a lactam such as ε-caprolactam or by the copolymerisation of such amines as ethylenediamine and hexamethylenediamine with such dibasic acids as adipic acid, sebacic acid, α,ω-undecandioic acid, α,ω-dodecandioic acid or their acid chlorides or anhydrides. Preferred such polyamides are nylon 210 (obtained by the condensation of ethylene diamine with sebacic acid), nylon 6 (polycaprolactam), nylon 66 (obtained by the condensation of hexamethylene diamine with adipic acid), nylon 610 (obtained by the condensation of hexamethylene diamine with sebacic acid) and nylon 611 (obtained by the condensation of hexamethylene diamine with α,ω-undecandioic acid). Polyesters which may be used as the condensation polymer preferably are those produced by homopolymerisation of a lactone such as β-propiolactone or by the condensation of alkylene glycols, such as ethylene glycol, with aromatic dibasic acids such as phthalic acid, the esterification reaction taking place either directly or through an intermediate diester such as dimethyl terephthalate. An example of a polysulfonamide condensation polymer which may be used in accordance with the invention is poly(hexamethylene m-benzene disulfonamide) which may be obtained by the polymerisation of hexamethylene diamine with m-benzene disulfonic acid or the corresponding acid chloride.

The process of the present invention makes possible the preparation of a wide variety of coated polymeric articles. One particularly important aspect of the invention is that it makes possible the coating of a polymeric substrate with a firmly adherent coating of a condensation polymer which had hitherto been regarded as incompatible with the substrate. Thus, for example, a polyolefin substrate such as polypropylene may effectively be coated with a polyamide such as nylon 610 in order to improve the printability, crimpability, dyeability and thermal and photochemical stability of the substrate. By appropriately choosing the condensation polymer it is possible to improve various other properties, for example the mechanical properties or aesthetic properties, of a polymeric substrate. Since the substrate may be used in a variety of forms, for example films, fibres, fabrics and moulded articles, the invention can be used to produce such items as film laminates, bicomponent fibres and filaments, surface-coated fabrics and surface-coated shaped articles in which the properties of the polymeric substrate have been appropriately modified by the coating of the condensation polymer. One example is improving the aesthetics of synthetic apparel fibres, which sometimes possess an undesirable smooth, shining appearance, and another is of improving the wetting characteristics of synthetic fibre tire cords in order to increase the adhesion between the tire cords and the rubber of the tire. Further examples are improving the durability and wet strengths of papers, improving the shrink resistance of wool, and producing bicomponent fibres by fibrillating, cutting or splitting film laminates (coated films).

The following examples serve to illustrate the invention.

EXAMPLES 1 TO 6

Film samples of various polymeric substrates were placed around a 9 cm. diameter borosilicate glass drum which formed a part of the corona apparatus. The drum was rotated at 10 r.p.m. during a corona discharge maintained between three lead electrodes (2.5 cm. width) equally spaced around the outside of an outer borosilicate glass cylinder and a grounded metal cylinder inside the borosilicate glass drum. Each of the three lead electrodes was fed from a separate high frequency generator, whose output consisted predominantly of a 0.5 mHz. peak, together with a 50 mHz. secondary peak. Higher harmonics were not sufficiently intense to modify the spectrum appreciably. The distance between the film sample and the outer lead electrodes was 0.5 cm. Prior to the corona discharge treatment air, nitrogen or some other inert gas, was swept through the apparatus at the rate of 60 ml. min.$^{-1}$ and this gas flow was maintained during corona treatment. The film samples were coronaed for the arbitrarily chosen period of 100 seconds on each side.

The coronaed film samples were then either spray or dip coated with monomer solutions of sebacyl chloride and hexamethylene diamine, these being the monomers required to produce the condensation polymer nylon 610. The sebacyl chloride solution was a 0.059 M solution in carbon tetrachloride or tetrachloroethylene and the hexamethylene diamine solution was a 0.1 M solution in 0.20 M aqueous sodium hydroxide.

Dip coating was effected by first dipping the film sample for 10 seconds in the solution of sebacyl chloride, allowing the dipped film to drain, and then dipping for 10 seconds in the solution of hexamethylene diamine. It was found that polymerisation was spontaneous upon dipping the treated film into the solution of the second monomer and was substantially complete to the point when the monomer present in the lesser quantity was used up. The resultant film and its coating of nylon 610 was then washed in methanol for 20 seconds.

Spray coating was effected by first spraying the coronaed film with the solution of sebacyl chloride and then with the solution of hexamethylene diamine. The sprayed film was then immediately washed in methanol for 10 seconds. Here also polymerisation was spontaneous upon the application of the second monomer.

After spray or dip coating, the film samples were heated for three minutes at the temperatures shown in Table I to dry the coated films.

All of the nylon-coated films were characterised by the use of infrared (IR) attenuated total reflection (ATR) spectroscopy. This technique allows a direct recording of the IR spectrum of the surface of a sample. Measurements were made with the Wilks #9 unit on a KRS-5 thallium bromide/thallium iodide crystal at 45°. ATR showed that both coronaed and non-coronaed polymer films were coated with a layer of a condensation polymer approximately 0.5 micron thick after dipping or spraying and heat treatment. The extent of the surface coating on the several different polymeric substrates was also evaluated by electron microscopy at 10,000 to 30,000 magnification. This indicated that under optimum conditions both spray and dip coating gave quite smooth and uniform surface coatings.

In order to assess the quality of the bond between the nylon coating and each polymeric substrate, tests were made on resistance to flexing and abrasion and to stripping with adhesive tape. Comparative tests were made between pairs of film samples which had been coated either with (Examples 1 to 6) or without (Controls 1 to 6) corona treatment. The results for the nylon 610 coating are compiled in Table I for ready comparison.

TABLE I

| Polymeric substrate | Corona treatment (seconds) | Heat treatment, °C.[a] | Abrasion test ASTM D1175, 10,000 cycles | Adhesive tape test |
|---|---|---|---|---|
| Example 1 ............ Polypropylene .................. | 100 | 130 | Resistant ... | Resistant. |
| Control 1 ................................................ | None | 130 | Failed ....... | Do. |
| Example 2 ............ Polyethylene terephthalate ... | 100 | 130 | Resistant ... | Resistant. |
| Control 2 ................................................ | None | 130 | Failed ....... | Part failed. |
| Example 3 ............ Polyethylene .................... | 100 | 100 | Resistant ... | Resistant. |
| Control 3 ................................................ | None | 100 | Failed ....... | Failed. |
| Example 4 ............ Polytetrafluoroethylene ....... | 100 | 100 | Part resistant. | Do. |
| Control 4 ................................................ | None | 100 | Failed ....... | Do. |
| Example 5 ............ Saran [b] ........................... | 100 | 80 | Resistant ... | Resistant. |
| Control 5 ................................................ | None | 80 | Failed ....... | Part failed. |
| Example 6 ............ Regenerated cellulose ......... | 100 | 100 | ............... | Resistant. |
| Control 6 ................................................ | None | 100 | ............... | Failed. |

[a] Temperature of heat treatment after formation of the coating on the substrate.
[b] Copolymer of vinylidene chloride and vinyl chloride containing at least 80% by weight of vinylidene chloride units.

The tests used to evaluate the tenacity with which the nylon cotings were bonded to the substrates were carried out as follows:

(i) Flexing and abrasion testing

Coated film samples (1 inch width) were subjected to 10,000 cycles on a Stoll Flex Tester (Custom Scientific Instruments). The test procedure was similar to ASTM #D1175, except that the machine was run without headweights. The load on the flexing bar was 180 g. After testing, the film samples were examined by optical microscopy and by electron microscopy. No obvious deterioration was detected in the flexed sides of the films. However, the abraded sides of each film showed marked deterioration. On non-coronaed, nylon-coated samples, the nylon coatings were removed in large flakes, exposing 60% or more of the substrate in the cases of polypropylene, polyethylene, Saran and polyethylene terephthalate. In the case of nylon-coated coronaed substrates, less than 10% of the above substrates were exposed in each test. In addition, the nylon coating on the coronaed substrates was removed by attrition in the form of a fine powder, or threads and not as large flakes.

For nylon-coated polytetrafluoroethylene, the nylon coating was quite extensively removed from the coronaed film, although the nylon-coated surface was still superior in resistance to abrasion in comparison with the non-coronaed polytetrafluoroethylene. The abrasion resistance of regenerated cellulose was not determined because of difficulties caused by the porous nature of the sample used.

(ii) Adhesive Tape Test

The bonding between the condensation polymer coating and the polymeric substrate was tested by stripping adhesive tape ("Scotch Brand"—Registered Trademark) from the coated surface, as described in Commercial Standards No. CS–227–59 (cf. U.S. Pat. No. 3,387,991).

As can be seen from the results summarised in Table I the process of the invention makes it possible to obtain coatings of a condensation polymer on a variety of polymeric substrates which are more strongly bonded than are coatings on the same substrates obtained without first subjecting the substrate to a corona discharge.

The nylon coatings were also tested for resistance to cleaning media by simulating dry or wet cleaning conditions. Several coated films were stirred with tetrachloroethylene at 80° F. for about 20 minutes. Other composites were treated with aqueous 5% ethanol solution at 100° F. for 20 minutes.

It was found as a result of these tests that the coatings obtained after subjecting the substrate to corona discharge were more resistant to the cleaning media than coatings formed on substrates which had not been coronaed.

EXAMPLE 7

In this example the effect of the length of exposure to the corona discharge on the strength of the bonding between substrate and coating was examined. A polypropylene film was acetone extracted to remove such impurities as surface oils and finishes, vacuum dried, and then corona treated in nitrogen for the times shown in Table II. A nylon 610 coating was applied on one side of the film by the spraying procedure described for Examples 1 to 6 and was then heated under the conditions described for Examples 1 to 6.

The strength of the nylon-polypropylene bonding was evaluated in the following way. The uncoated side of the polypropylene film was fastened to rigid metal supports by double surface adhesive tape. Perforated metal angle brackets (1.5 x 1.5 cm. contact area) were cemented to the exposed, coated surface of the film with a 30% aqueous solution of polyacrylic acid. After a predetermined drying time (15 hours) the loads which had to be applied to the brackets in order to destroy the polypropylene-nylon coating bond were measured, and average values recorded. In all cases, dyeing or microscopy showed that the system cleaved at the nylon-polypropylene interface. The results are given in Table II below and clearly show that non-coronaed samples had an appreciably lower bonding strength than the coronaed samples. The bonding appeared to reach a maximum after a relatively short corona exposure and the optimum time using the described corona procedure was found to be of the order of 2 seconds.

TABLE II
Effect of corona exposure time on nylon bonding

| Corona time (sec.) | 0 | 1 | 2 | 5 | 10 | 20 | 60 | 120 | 300 |
|---|---|---|---|---|---|---|---|---|---|
| Average bonding (g.)* | 900 | 1,270 | 1,400 | 1,250 | 1,150 | 1,250 | 1,350 | 1,250 | 1,500 |

*Weight required to destroy the nylon-polypropylene bond.

EXAMPLE 8

In this example the tensile properties of nylon-coated polypropylene films were examined.

The tensile strength of various nylon-coated polypropylene films prepared in a manner similar to that of Example 7 were measured using an Instron Tensile Tester (Type TT–C) and a method similar to ASTM #D882–67.

The results showed a marked increase in tensile strength for films which had been corona-treated, then nylon coated on both surfaces, as compared with nylon-coated films prepared without corona treatment. Thus the corona-treated and coated films had tensile strengths averaging 590 kg. cm.$^{-2}$ while the non-coronaed and coated films had tensile strengths averaging only 360 kg. cm.$^{-2}$. Uncoated polypropylene films showed tensile strengths of the order of 270 kg. cm.$^{-2}$. No change in percentage elongation at break was detected in any of the samples.

EXAMPLE 9

A woollen fabric was exposed to a corona discharge and was coated with a layer of nylon 610 by the process described in Examples 1 to 6. The coating on the wool fibres of the fabric was found to be more uniform and the coated fabric was more resistant to shrinkage, abrasion and flexing than when the coating was applied to wool fibres which had not been subjected to a corona discharge.

EXAMPLE 10

A coating of nylon 610 was applied by the procedure of Examples 1 to 6 to a sample of paper which had been exposed to a corona discharge and was found to be strongly adherent. The coated paper possessed properties making it especially suitable for use in applications involving repeated handling.

EXAMPLES 11 AND 12

Polypropylene fibres and polyethylene terephthalate fibres were exposed to a corona discharge and coated with a layer of nylon 610 by the procedure described in Examples 1 to 6. The coated fibres were then immersed in dyebaths containing Procion Brilliant 2BS a nylon dye or Diamine Fast Red F an acid wool dyestuff. In each case the coated fibres were readily dyed and deeply colored. By way of contrast the uncoated fibres of polypropylene and polyethylene terephthalate were only faintly colored after immersion in the same dyebaths.

EXAMPLE 13

Coatings of polyethylene terephthalate on polypropylene substrates were prepared by dipping corona-treated polypropylene film (corona exposure 10 seconds in nitrogen) into terephthaloyl chloride solution (0.3 M in toluene), allowing the solvent to evaporate, and then dipping into an ethylene glycol solution (0.5 M in acetone). The treated film was allowed to dry in air for 5 minutes, and then heated at 130° C. for 3 minutes. The presence of a polyethylene terephthalate coating was confirmed by ATR infrared spectroscopy.

EXAMPLE 14

Coatings of poly(hexamethylene m-benzenedisulfonamide) (PHBS) on a polypropylene substrate were prepared by corona-treating the polypropylene film for 10 seconds in nitrogen, dipping the film first into aqueous basic hexamethylenediamine (0.026 M, 0.05 M sodium carbonate) and then into m-benzenedisulfonyl chloride solution (0.025 M in methylene chloride) and allowing the treated film to dry in air for about 15 minutes. The presence of a polymeric sulfonamide coating on the polypropylene film was confirmed by ATR infrared spectroscopy.

EXAMPLE 15

Coatings of poly($\beta$-propriolactone) on a polypropylene substrate were prepared by corona-treating a polypropylene film for 100 seconds in air, dipping the film in undiluted $\beta$-propriolactone and then exposing the coated film to boron trifluoride vapour for five minutes. A waxy polymeric coating was formed, the solidification of which was enhanced by washing with acetone.

The polymerisation was rapid and it was found that the heat of reaction was sufficient to cause localised melting in polypropylene films having a thickness of 20 microns. No melting took place if films having a thickness of 50 microns were used or if polyethylene terephthalate films 25 microns thick were used.

We claim:

1. A process for providing a polymeric substrate with a firmly adherent coating of a condensation polymer, which process comprises (a) exposing a polymeric substrate selected from polyesters, polyolefins, polyvinyls, polyvinylidenes, wool, cellulose and cellulose derivatives, to an electrical discharge;
(b) subsequently applying to the exposed substrate a monomeric precursor or precursors of a condensation polymer selected from polyamides, polysulfonamides, polyurethanes, polyepoxides and polyesters; and
(c) polymerising the precursor or precursors in situ on the substrate by stepwise polymerization to form a firmly adherent coating to said substrate.

2. A process as claimed in claim 1, wherein the polymeric substrate is selected from polyethylene terephthalate, polyethylene, polypropylene, polytetrafluoroethylene, polyvinyl chloride and polyvinylidene chloride.

3. A process as claimed in claim 1, wherein the condensation polymer is selected from nylon 210, 6, 66, 610 and 611, polyethylene terephthalate, poly($\beta$-propiolactone) and poly(hexamethylene m-benzenedisulfonamide).

4. A process as claimed in claim 1 and including the step of subjecting the coated substrate to heat treatment at a temperature of from 75° to 150° C.

5. A process as claimed in claim 1, wherein the substrate is in the form of a film.

6. A process as claimed in claim 1, wherein the substrate is in fibre form.

7. A process as claimed in claim 1, wherein the substrate is in fabric form.

8. A process as claimed in claim 1, wherein step (b) comprises dip-coating said exposed substrate in a liquid medium of said monomeric precursor or precursors.

9. A process as claimed in claim 1, wherein step (b) comprises spray-coating said exposed substrate with a liquid medium of said monomeric precursor or precursors.

10. A process as claimed in claim 1, wherein step (a) comprises exposing said polymeric substrate to a corona discharge.

11. A process as claimed in claim 1 which further comprises heat-treating the coated substrate.

12. A process as claimed in claim 1 wherein said polymeric substrate is exposed to said electrical discharge for a period of about two seconds to provide optimum strength between said substrate and said condensation polymer coating.

References Cited

UNITED STATES PATENTS

| | | | |
|---|---|---|---|
| 3,353,988 | 11/1967 | Wolinski | 117—138 A |
| 3,093,441 | 6/1963 | Whitfield et al. | 117—141 |
| 3,600,122 | 8/1971 | Coleman | 117—93.1 CD |
| 3,639,134 | 2/1972 | Stegmeier et al. | 117—93.1 CD |
| 2,999,764 | 9/1961 | Rhoads | 117—47 A |
| 3,262,808 | 7/1966 | Crooks et al. | 117—47 A |
| 3,455,774 | 7/1969 | Lindsey et al. | 117—47 A |
| 3,485,653 | 12/1969 | Hermite et al. | 117—47 A |

MICHAEL SOFOCLEOUS, Primary Examiner

U.S. Cl. X.R.

117—47 R, 55, 62.1, 93.1 CD, 138.8 A, E, F, 141, 143 A DIG. 3